(12) United States Patent
Umebayashi et al.

(10) Patent No.: US 12,252,871 B2
(45) Date of Patent: Mar. 18, 2025

(54) DIAGNOSIS ASSIST DEVICE FOR WORKING MACHINE

(71) Applicant: KUBOTA CORPORATION, Osaka (JP)

(72) Inventors: Shigeki Umebayashi, Osaka (JP); Ko Ominami, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 28 days.

(21) Appl. No.: 18/202,464

(22) Filed: May 26, 2023

(65) Prior Publication Data

US 2023/0295903 A1 Sep. 21, 2023

Related U.S. Application Data

(63) Continuation of application No. PCT/JP2021/045029, filed on Dec. 8, 2021.

(30) Foreign Application Priority Data

Dec. 10, 2020 (JP) ................................. 2020-205221

(51) Int. Cl.
*G05B 23/00* (2006.01)
*E02F 9/26* (2006.01)
(52) U.S. Cl.
CPC .............. *E02F 9/267* (2013.01); *E02F 9/265* (2013.01)
(58) Field of Classification Search
USPC ........ 340/679, 680, 687, 686.5, 691.6, 3.43, 340/3.44, 5.32, 7.55, 10.6
See application file for complete search history.

(56) References Cited

U.S. PATENT DOCUMENTS

2010/0076612 A1\* 3/2010 Robertson ........... H02M 5/4505
700/286
2012/0040612 A1 2/2012 Lee et al.
(Continued)

FOREIGN PATENT DOCUMENTS

EP 3 654 279 A1 5/2020
JP 2014-025343 A 2/2014
(Continued)

OTHER PUBLICATIONS

International Search Report issued Feb. 15, 2022 in international application No. PCT/JP2021/045029, and English language translation thereof.

(Continued)

*Primary Examiner* — Daniel Previl
(74) *Attorney, Agent, or Firm* — Greenblum & Bernstein, P.L.C.

(57) ABSTRACT

A diagnosis assisting device includes: an imager to capture an image of a working machine; a display to display the captured image of the working machine; a controller to control the display; a memory to store one or more pieces of drawing data of one or more of the working machines; an input to receive operator input; and a data extractor to extract one of the stored one or more pieces of drawing data that corresponds to at least one component to be diagnosed, wherein the controller is configured or programmed to cause the display to display the extracted one of the one or more pieces of drawing data and the captured image of the working machine such that the at least one component indicated by the extracted one of the one or more pieces of drawing data is superimposed on at least one corresponding component in the captured image.

15 Claims, 17 Drawing Sheets

(56) References Cited

U.S. PATENT DOCUMENTS

| | | | |
|---|---|---|---|
| 2014/0236418 A1 | 8/2014 | Koga et al. | |
| 2018/0165884 A1 | 6/2018 | Wagner et al. | |
| 2018/0295357 A1* | 10/2018 | Okumura | H04N 17/04 |
| 2018/0336806 A1* | 11/2018 | Karthik | H04N 13/293 |
| 2021/0254314 A1* | 8/2021 | Takata | G07C 5/008 |

FOREIGN PATENT DOCUMENTS

| | | |
|---|---|---|
| JP | 2015-045145 A | 3/2015 |
| JP | 2016-024513 A | 2/2016 |
| JP | 2019-020914 A | 2/2019 |
| JP | 2020-040519 A | 3/2020 |
| WO | 2013/047408 A1 | 4/2013 |

OTHER PUBLICATIONS

Written Opinion issued Feb. 15, 2022 in international application No. PCT/JP2021/045029, and English language translation thereof.
Office Action issued in Corresponding EP Patent Application No. 21903421.2, dated Nov. 12, 2024.

* cited by examiner

Fig.1
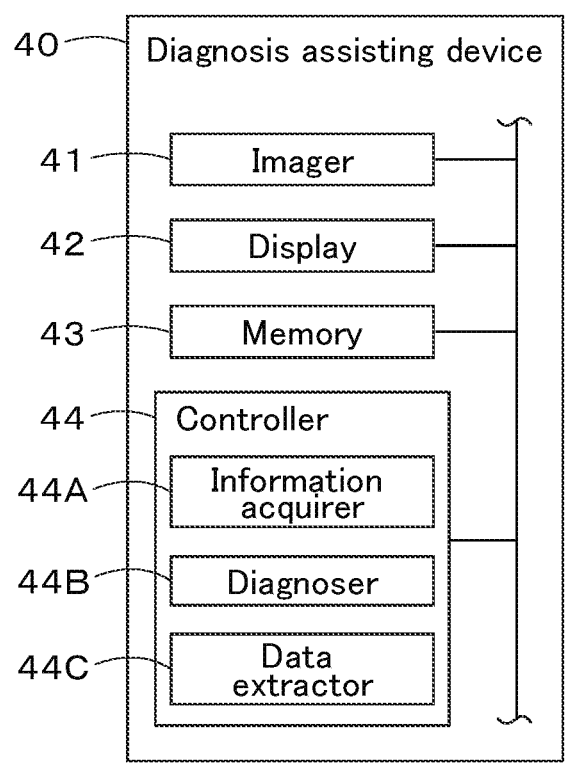
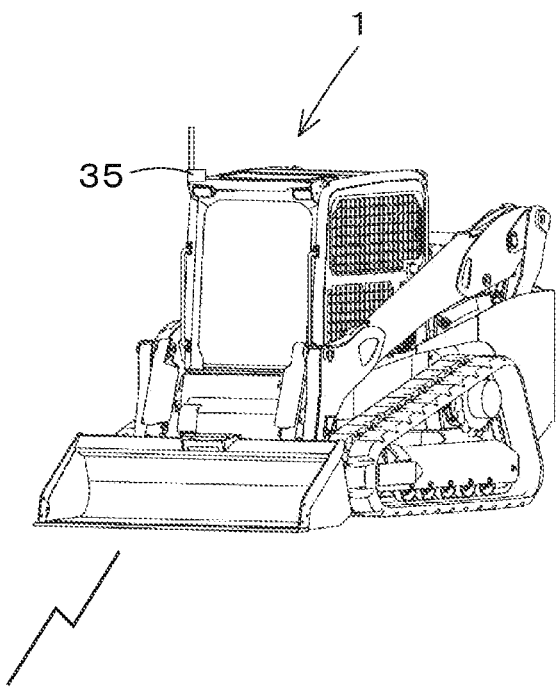

| Machine information | | | Diagnosis information | | | |
|---|---|---|---|---|---|---|
| | Unique information | | Error code | Error details | Component | Failure symptom |
| Machine type | Model (model number) | Serial number (identification information) | | | | |
| CTL | CTL95 | KJ-1258991 | A1 | Engine speed: abnormal | Component A | ∗∗∗ |
| | | | A2 | Vehicle speed sensor: abnormal | Component B | ∗∗∗ |
| | | | A3 | Hydraulic pump output: abnormal | Component C | ∗∗∗ |
| | | | ... | ... | ... | ... |
| | | | ... | ... | ... | ... |
| SSL | CTL45 | KJ-4321441 | A1 | Hydraulic pump output: abnormal | Component A | ∗∗∗ |
| | | | A2 | Vehicle speed sensor: abnormal | Component B | ∗∗∗ |
| | | | A3 | Engine speed: abnormal | Component C | ∗∗∗ |
| | | | ... | ... | ... | ... |
| | | | ... | ... | ... | ... |
| ... | ... | ... | ... | ... | ... | ... |

X1 points to row A1 for CTL95.

| Unique information | | | Drawing data |
|---|---|---|---|
| Machine type | Model (model number) | Serial number (identification information) | |
| CTL | CTL95 | KJ-1258991 | Drawing data (KB1) |
| | | KJ-1258992 | Drawing data (KB2) |
| | | KJ-1258993 | ... |
| | | KJ-1400001 | ... |
| ... | ... | ... | ... |
| SSL | CTL45 | KJ-4321441 | Drawing data (KB101) |
| | | KJ-4321442 | ... |
| | | KJ-4321443 | ... |
| | | KJ-4321444 | ... |
| ... | ... | ... | ... |

Fig.4

| Machine type | Unique information | | Manual data |
|---|---|---|---|
| | Model (model number) | Serial number (identification information) | |
| CTL | CTL95 | KJ-1258991 | Engine details (specifications, shape, model number) |
| | | KJ-1258992 | Vehicle speed sensor (specifications, shape, model number) |
| | | KJ-1258993 | Hydraulic pump (specifications, shape, model number) |
| | | KJ-1400001 | |
| ... | ... | ... | ... |
| SSL | CTL45 | KJ-4321441 | Engine details (specifications, shape, model number) |
| | | KJ-4321442 | Vehicle speed sensor (specifications, shape, model number) |
| | | KJ-4321443 | Hydraulic pump (specifications, shape, model number) |
| | | KJ-4321444 | |
| ... | ... | ... | ... |

Fig.11
Captured image
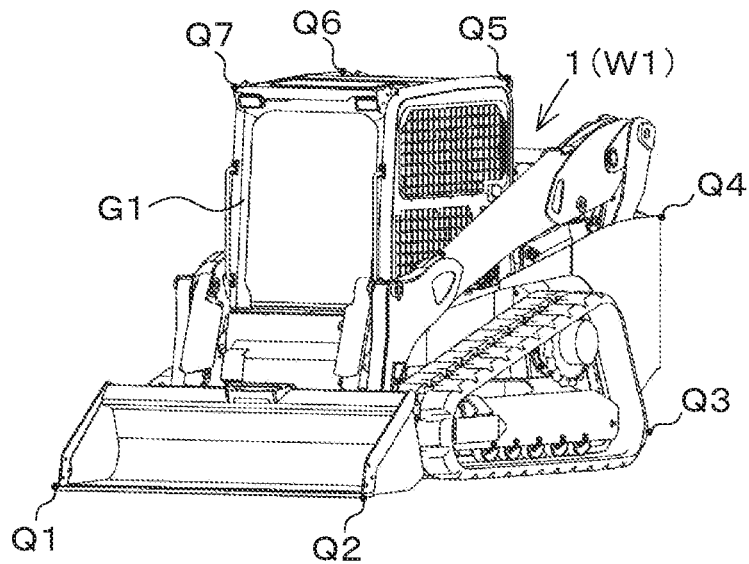
Drawing data
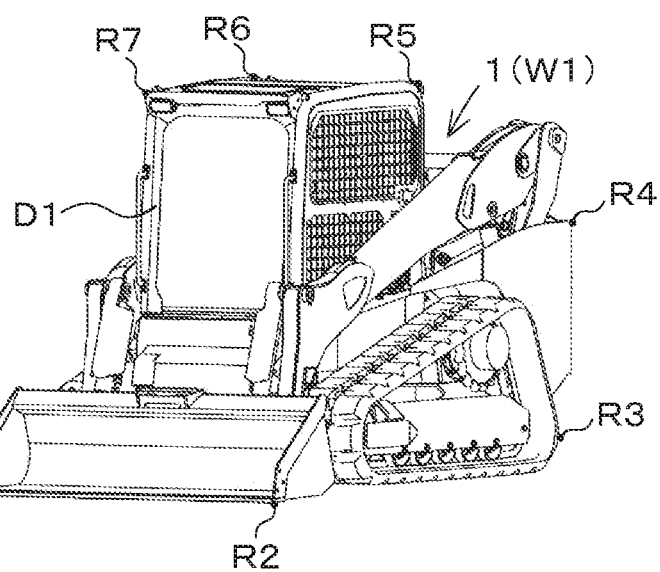

DIAGNOSIS ASSIST DEVICE FOR WORKING MACHINE

CROSS REFERENCE TO RELATED APPLICATIONS

This application is a continuation application of International Application No. PCT/JP2021/045029, filed on Dec. 8, 2021, which claims the benefit of priority to Japanese Patent Application No. JP 2020-205221, filed on Dec. 10, 2020. The entire contents of each of these applications are hereby incorporated herein by reference.

BACKGROUND OF THE INVENTION

1. Field of the Invention

The present invention relates to a diagnosis assisting device for a working machine.

2. Description of the Related Art

Hitherto, Japanese Unexamined Patent Application Publication No. 2014-25343 is known as a failure diagnosis system for a working machine such as a backhoe.

The system of Japanese Unexamined Patent Application Publication No. 2014-25343 includes a transmitter that transmits the operation status of each portion of the working machine to a server by electronic mail, and a computer that can access the server. The computer includes a failure estimator that automatically estimates a failure in the working machine based on the acquired operation status.

SUMMARY OF THE INVENTION

In the system of Japanese Unexamined Patent Application Publication No. 2014-25343, the failure can be estimated based on the operation status of the working machine, and the operator can replace a component based on the failure estimated by the system. In order that the operator replace the component of the working machine, however, the operator needs to grasp the position of the component to be replaced. In the related-art circumstances, the operator grasps the position of the component by reading a manual, and replaces the component of the working machine.

However, it takes a long period for the operator to grasp the disposition of the component by reading the manual or the like. When the contents of the manual are not directed to the working machine that is the target of component replacement, the actual position of the component may differ from the position of the component shown in the manual, thereby requiring time and effort for the component replacement.

Preferred embodiments of the present invention provide diagnosis assisting devices each for a working machine with which the position of a component can be known easily.

The present invention provides the following technical solutions to solve the technical problem described above.

A diagnosis assisting device for a working machine, includes: an imager to capture an image of a working machine; a display to display the image of the working machine captured by the imager; a controller to control the display; a memory to store one or more pieces of drawing data of one or more of the working machines; an input to receive input from an operator; and a data extractor to extract one of the one or more pieces of drawing data stored in the memory that corresponds to at least one component to be diagnosed, wherein the controller is configured or programmed to cause the display to display the one of the one or more pieces of drawing data extracted by the data extractor and the image of the working machine captured by the imager such that the at least one component indicated by the one of the one or more pieces of drawing data is superimposed on at least one corresponding component in the image of the working machine captured by the imager.

The controller may be configured or programmed to cause the display to display the captured image of the working machine and the one of the one or more pieces of drawing data such that, when the captured image changes, the at least one component indicated by the one of the one or more pieces of drawing data follows the at least one corresponding component in the captured image as the captured image changes.

The diagnosis assisting device may further include an information acquirer to acquire a piece of information transmitted from the working machine and related to an error having occurred in the working machine. The controller may be configured or programmed to identify the at least one component to be diagnosed based on the piece of information related to the error acquired by the information acquirer.

The controller may be configured or programmed to, when the information acquirer acquires a plurality of the pieces of information related to a plurality of the errors having occurred in the working machine, cause the display to display the plurality of pieces of information related to the plurality of the errors, and identify, as the at least one component to be diagnosed, a component corresponding to one of the plurality of errors that corresponds to one of the plurality of pieces of information displayed by the display and selected by the operator via the input.

The memory may store priority levels of a plurality of the pieces of information related to a plurality of the errors. The controller may be configured or programmed to, when the information acquirer acquires a plurality of the pieces of information related to a plurality of the errors having occurred in the working machine, identify, as the at least one component to be diagnosed, a component corresponding to one of the plurality of pieces of information relating to the plurality of errors, the one of the plurality of pieces of information having a highest one of the priority levels.

The diagnosis assisting device may further include a communication device. The information acquirer may be configured or programmed to, upon establishment of communication between the information acquirer and a predetermined server via the communication device by a predetermined communication method, transmit the piece of information related to the error to the server.

The memory may store one or more predicted failure symptoms of the working machine. The controller may be configured or programmed to cause the display to display one or more of the one or more predicted failure symptoms corresponding to a state of the working machine, and identify the at least one component to be diagnosed based on one of the displayed one or more of the one or more predicted failure symptoms selected by the operator via the input.

The memory may store priority levels of a plurality of the predicted failure symptoms. The controller may be configured or programmed to, when a plurality of the predicted failure symptoms corresponding to the state of the working machine are present, cause the display to display the plurality of the predicted failure symptoms in a descending order in terms of the priority levels.

The diagnosis assisting device may further include: an information acquirer to acquire a piece of information transmitted from the working machine and related to an error having occurred in the working machine; and a communication device. The information acquirer may be configured or programmed to, upon establishment of communication between the information acquirer and a predetermined server via the communication device by a predetermined communication method, transmit, to the server, the one of the displayed one or more of the one or more predicted failure symptoms selected by the operator via the input.

The diagnosis assisting device may further include: an information acquirer to acquire a piece of information transmitted from the working machine and related to an error having occurred in the working machine; and a communication device. The information acquirer may be configured or programmed to, upon establishment of communication between the information acquirer and a predetermined server via the communication device by a predetermined communication method, acquire the one or more predicted failure symptoms from the server and cause the memory to store the one or more predicted failure symptoms.

The memory may store diagnoses for the working machine. The controller may be configured or programmed to cause the display to display one or more of the diagnoses corresponding to a state of the working machine, and identify the at least one component to be diagnosed based on one of the displayed one or more of the diagnoses selected by the operator via the input.

The memory may store priority levels of a plurality of diagnoses. The controller may be configured or programmed to, when a plurality of the diagnoses corresponding to a state of the working machine are present, cause the display to display the plurality of the diagnoses in a descending order in terms of the priority levels.

The diagnosis assisting device may further include: an information acquirer to acquire a piece of information transmitted from the working machine and related to an error having occurred in the working machine; and a communication device. The information acquirer may be configured or programmed to, upon establishment of communication between the information acquirer and a predetermined server via the communication device by a predetermined communication method, transmit, to the server, information corresponding to the one of the displayed one or more of the diagnoses selected by the operator via the input.

The diagnosis assisting device may further include: an information acquirer to acquire a piece of information transmitted from the working machine and related to an error having occurred in the working machine; and a communication device. The information acquirer may be configured or programmed to, upon establishment of communication between the information acquirer and a predetermined server via the communication device by a predetermined communication method, automatically acquire the diagnoses for the working machine from the server and cause the memory to store the diagnoses.

The memory may store one or more pieces of manual data indicating one or more manuals related to one or more of the working machines. The controller may be configured or programmed to cause the display to display one or more of the one or more pieces of manual data corresponding to the at least one component.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 1 is a block diagram of a diagnosis assisting device for a working machine.

FIG. 2 is a diagram illustrating an example of machine information.

FIG. 3 is a diagram illustrating a relationship between working machines and drawing data.

FIG. 4 is a diagram illustrating a relationship between working machines and manual data.

FIG. 11 is an explanatory diagram for describing matching between the captured image G1 and a line drawing D1 in the drawing data.

DETAILED DESCRIPTION OF THE PREFERRED EMBODIMENTS

Figure 5:
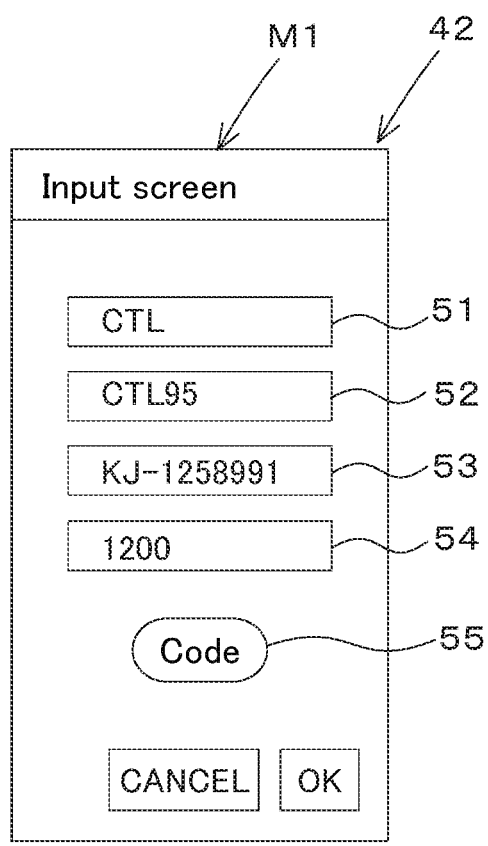
FIG. 5 is a diagram illustrating an example of an input screen M1.

The preferred embodiments will now be described with reference to the accompanying drawings, wherein like reference numerals designate corresponding or identical elements throughout the various drawings. The drawings are to be viewed in an orientation in which the reference numerals are viewed correctly.

A diagnosis assisting device for a working machine according to the present invention is described below.

Figure 15:
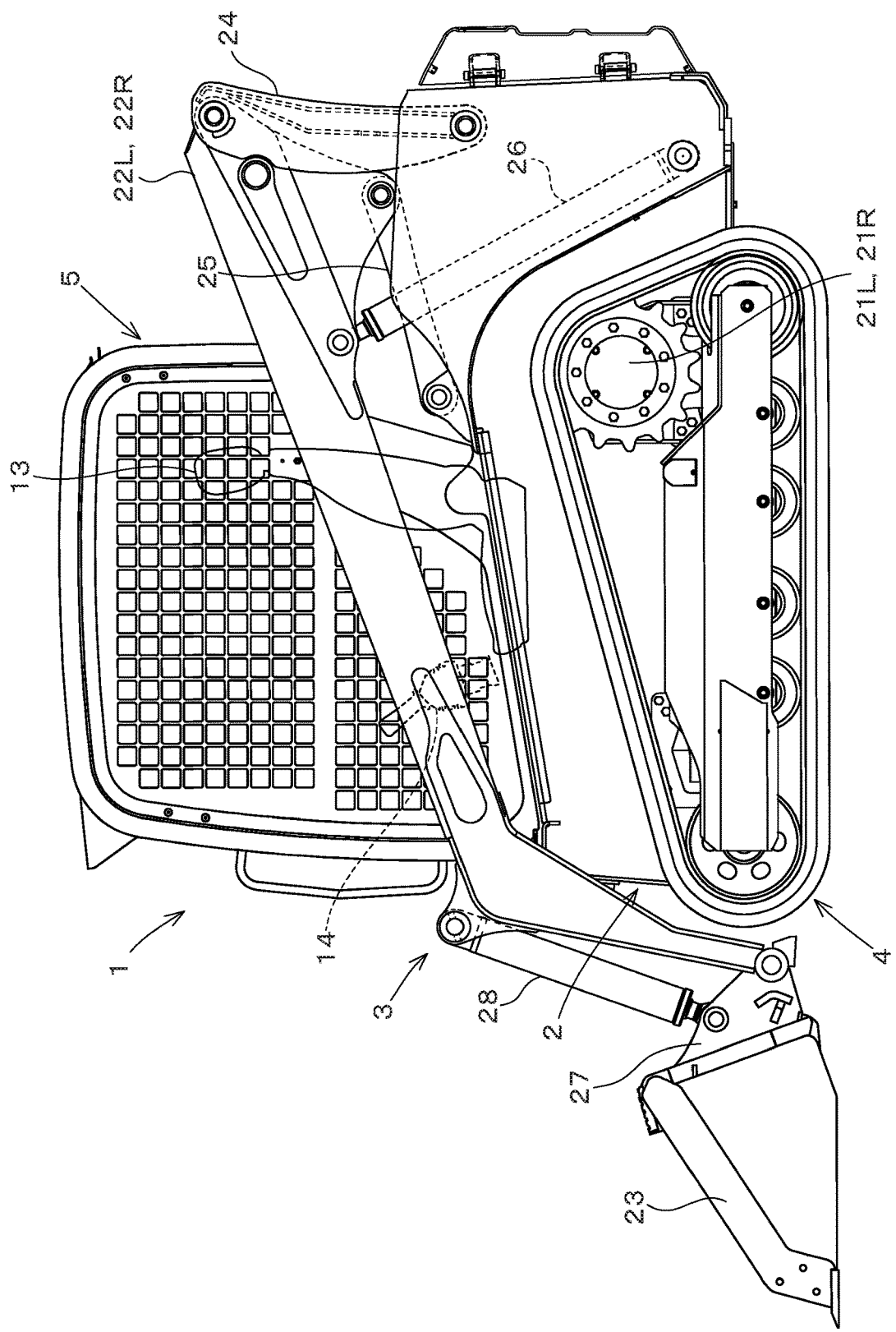
FIG. 15 is a side view of the working machine.

For example, the working machine according to the present invention is construction machinery such as a backhoe, a compact track loader, or a skid-steer loader, agricultural machinery such as a tractor, a combine, or a mower, or various other industrial machinery. FIG. 15 illustrates the compact track loader as an example of at least one working machine 1. The working machine is not limited to the track loader, and may be, for example, a tractor, a skid-steer loader, a compact track loader, or a backhoe. In this embodiment, a forward direction refers to a direction in which an operating person (operator) sifting on an operator's seat 13 of the working machine 1 is oriented (leftward direction in FIG. 15), and a rearward direction refers to the opposite direction (rightward direction in FIG. 15). A term "left" refers to the left of the operating person (near side in FIG. 15), and a term "right" refers to the right of the operating person (far side in FIG. 15).

As illustrated in FIG. 15, the working machine 1 includes a machine body 2, a working device 3 attached to the machine body 2, and at least one traveling device 4 that supports the machine body 2. A cabin 5 is mounted above the machine body 2. The cabin 5 is supported at the rear by a support bracket (not illustrated) and swingable about a support shaft (not illustrated). The cabin 5 can be supported at the front by a front portion of the machine body 2.

The operator's seat 13 is provided in the cabin 5. A traveling operation device 14 for operating the traveling device 4 is disposed on one side (for example, left) of the operator's seat 13.

The traveling device 4 is a crawler type traveling hydraulic device. The traveling devices 4 are provided below the left and right of the machine body 2.

The working device 3 includes a boom 22L, a boom 22R, and a bucket 23 (working tool) attached to the distal ends of the boom 22L and the boom 22R. The boom 22L is disposed at the left of the machine body 2. The boom 22R is disposed at the right of the machine body 2. The boom 22L and the boom 22R are coupled by a coupler (not illustrated) provided between the boom 22L and the boom 22R. Each of the boom 22L and the boom 22R is supported by a first lift link 24 and a second lift link 25. Lift cylinders 26 that are double-acting type hydraulic cylinders are provided in conjunction with the boom 22L and the boom 22R between the proximal portions of the boom 22L and the boom 22R and the rear lower portion of the machine body 2. Therefore, the boom 22L and the boom 22R simultaneously swing up or down by simultaneously extending or contracting the lift cylinders 26. Attachment brackets 27 are coupled to the distal ends of the boom 22L and the boom 22R to pivot about a lateral axis. The back of the bucket 23 is attached to the attachment brackets 27.

Tilt cylinders 28 that are double-acting type hydraulic cylinders are interposed in conjunction with the boom 22L and the boom 22R between the attachment brackets 27 and intermediate portions of the boom 22L and the boom 22R close to the distal ends. The bucket 23 swings (shovels or dumps) by extending or contracting the tilt cylinders 28.

The bucket 23 is attachable to or detachable from the attachment brackets 27. When the bucket 23 is detached, various attachments (hydraulic-drive working tools including hydraulic actuators) can be attached to the attachment brackets 27 to perform various types of work other than excavation (or other excavation work).

A prime mover is provided at the rear on the bottom wall of the machine body (vehicle body) 2. The prime mover is a diesel engine, a motor generator, or the like. A fuel tank and a hydraulic fluid tank are provided at the front on the bottom wall of the machine body 2.

In addition to the traveling device 4 and the prime mover described above, the working machine 1 includes hydraulic devices such as a hydraulic pump, a control valve, and hydraulic cylinders (lift cylinders 26 and tilt cylinders 28), and various components (devices) such as a radiator, an oil tank, a hydraulic pump, a battery, an air conditioner unit, and sensors.

FIG. 1 illustrates a diagnosis assisting device 40 for a working machine 1. The diagnosis assisting device 40 for a working machine 1 is a portable mobile terminal such as a tablet, a smartphone, or a notebook personal computer.

The diagnosis assisting device 40 for the working machine 1 includes an imager 41, a display 42, a memory 43, and a controller 44. The imager 41 includes a camera such as a CCD camera or an infrared camera. The imager 41 is attached to a housing of the diagnosis assisting device 40. An image of a subject can be captured by orienting the camera to the subject.

The display 42 is a liquid crystal panel, an organic EL panel, or the like and can display various types of information. For example, the display 42 can display a captured image G1 obtained by the imager 41. The memory 43 is a non-volatile memory or the like and stores various types of application software and data.

The controller 44 includes a CPU and/or the like and controls the diagnosis assisting device 40, that is, performs various controls relating to the imager 41, the display 42, and the memory 43.

The memory 43 of the diagnosis assisting device 40 for the working machine 1 stores application software for diagnosing failure(s) of the working machine 1 (failure diagnosis software). The controller 44 operates as the diagnosis assisting device 40 that diagnoses failure(s) by starting the failure diagnosis software.

The diagnosis assisting device 40 for the working machine 1 is described below in detail.

As illustrated in FIG. 2, the memory 43 stores information related to the working machine 1 (machine information). For example, the machine information includes unique information such as a machine type, model (model number), and serial number (identification information) of the working machine 1, and diagnosis information indicating an error code (error) of a failure, details of the error code (error) (error details), and failure symptom(s) of each component. The unique information stored in the memory 43 differs among a plurality of working machines 1. The memory 43 stores the diagnosis information in association with the unique information.

As illustrated in FIG. 3, the memory 43 stores a plurality of pieces of drawing data. The plurality of pieces of drawing data is pieces of CAD data such as two-dimensional or three-dimensional CAD data indicating line drawings of the entire working machines 1 and their components. The plurality of pieces of drawing data are associated with pieces of unique information. When the unique information is acquired, the controller 44 can extract the drawing data associated with the acquired unique information from the memory 43. For example, when the model number is "CTL95" and the serial number is "KJ-1400001", the controller 44 can extract drawing data "KB2" from the memory 43.

As illustrated in FIG. 4, the memory 43 stores at least one piece of manual data related to the working machine 1. The manual data indicates an operation method of the working machine 1 and component details such as specifications, shapes, and model numbers of the components of the working machine 1.

When the failure diagnosis software stored in the memory 43 is started, the controller 44 causes the display 42 to display various screens related to failure diagnosis. Specifically, the controller 44 causes the display 42 to display a home screen (not illustrated) when the failure diagnosis software is activated. When an operator performs a predetermined operation on the diagnosis assisting device 40 while the display 42 is displaying the home screen, the controller 44 causes the display 42 to display an input screen M1 as illustrated in FIG. 5.

The input screen M1 of FIG. 5 includes a machine type input field 51 where a machine type is input, a model input field 52 where a model (model number) is input, a serial number input field 53 where a serial number (identification information) is input, and a time input field 54 where a cumulative operating period (hour meter) of the working machine 1 is input. When unique information is input to the machine type input field 51, the model input field 52, and the serial number input field 53 of the input screen M1, the controller 44 can acquire information from the memory 43 based on the input information and identify the working machine 1. In other words, the controller 44 can extract information from the machine information stored in the memory 43 and acquire diagnosis information and drawing data associated with the unique information. The controller 44 can identify the working machine 1 based only on the serial number input to the serial number input field 53.

As illustrated in FIG. 5, a code button 55 is displayed on the input screen M1. When the operator selects the code button 55 by operating the diagnosis assisting device 40, the imager 41 is activated. The imager 41 captures an image of a barcode, a QR code (registered trademark), or the like attached to the working machine 1, and the controller 44 can read unique information indicated by the image of the barcode, the QR code (registered trademark), or the like captured by the imager 41. Thus, the controller 44 can identify the working machine 1 based on the read unique information.

For convenience of the description, the working machine 1 identified by the controller 44 based on the unique information may hereinafter be referred to as "specific working machine".

Figure 6:
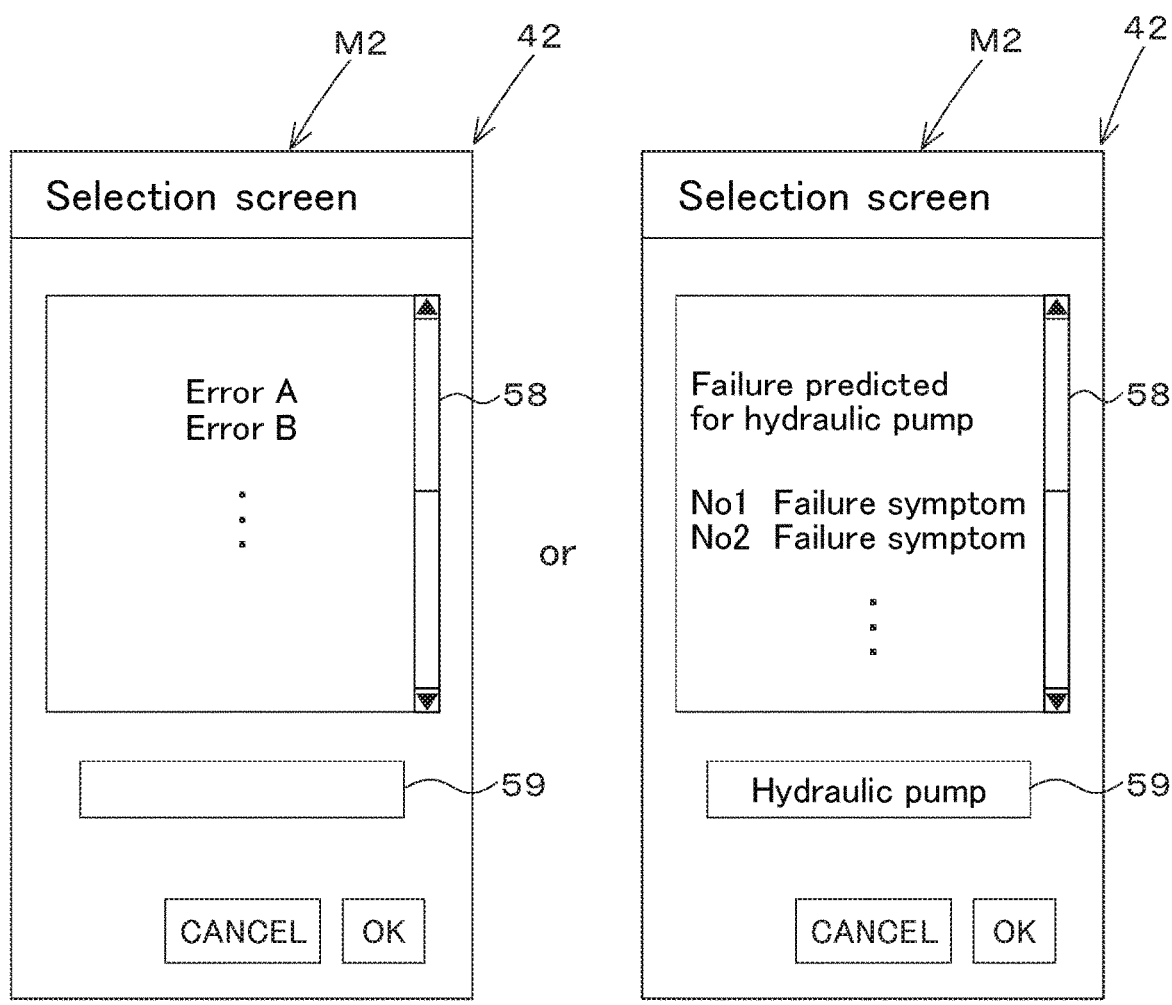
FIG. 6 is a diagram illustrating an example of a selection screen M2.

When the working machine 1 is identified, the controller 44 causes the display 42 to display a selection screen M2 as illustrated in FIG. 6. The selection screen M2 includes a failure selection field 58 where errors (error codes) or failure symptoms are selected, and a failure search field 59 where an input of a failure search condition is received.

The failure selection field 58 displays an error list including a plurality of errors (error codes) associated with the specific working machine. For example, when a specific working machine W1 has a model number "CTL95" and a serial number "KJ-1258991" as illustrated in FIG. 2, the controller 44 searches for diagnosis information X1 of CTL95 and KJ-1258991, extracts a list of errors (error codes) occurring in the specific working machine W1 from the diagnosis information X1 obtained by the search, and displays the extracted errors in the failure selection field 58 of the display 42. The failure selection field 58 receives the operator's selection instruction, and the controller 44 can select an error to be displayed in detail from the error list in response to the selection instruction.

The memory 43 may store a plurality of errors with priority levels of diagnosis or repair set in advance. When the specific working machine W1 has a plurality of errors in this case, the controller 44 identifies a component corresponding to an error having a high priority level as a diagnosis target component (component to be diagnosed), and causes the display 42 to display the component. For example, the priority levels of the errors may be set in descending order of easiness of diagnosis work or repair or replacement work, may be set depending on periods required for the diagnosis work or the repair or replacement work, may be set depending on costs for the diagnosis work or the repair or replacement work, may be set depending on periods required to acquire replacement components, or may be set by combining those factors.

When the name of a component or the like is input to the failure search field 59, the display 42 displays a plurality of failure symptoms related to the component in the failure selection field 58. A failure symptom is a symptom of a failure predicted for a certain component. For example, when the error occurring in the specific working machine W1 is not recorded in the memory 43, the display 42 can extract information from the machine information stored in the memory 43 based on the name of the component or the like input to the failure search field 59, and display failure symptom(s) predicted from the component in the failure selection field 58.

For example, when a component name "hydraulic pump" is input to the failure search field 59, the display 42 displays failure symptoms predicted from the hydraulic pump (predicted failure symptoms) in the failure selection field 58. Thus, it is possible to know the failure symptoms predicted in each component of the working machine 1 (predicted failure symptoms). In this case, a predicted failure symptom to be displayed in more detail can be selected from the list of predicted failure symptoms in the failure selection field 58 in response to the operator's selection instruction.

When the memory 43 stores a plurality of predicted failure symptoms with priority levels of diagnosis or repair set in advance and a plurality of predicted failure symptoms is present in association with the state of the working machine 1, the controller 44 may cause the display 42 to display the predicted failure symptoms in a descending order in terms of the priority levels. In this case, the controller 44 identifies a diagnosis target component based on one of the failure symptoms that is displayed by the display 42 and selected by the operator via an input and causes the display 42 to display the identified diagnosis target component.

For example, the priority levels described above may be set in descending order of easiness of diagnosis work or repair or replacement work, may be set depending on periods required for the diagnosis work or the repair or replacement work, may be set depending on costs for the diagnosis work or the repair or replacement work, may be set depending on periods required to acquire replacement components, or may be set by combining those factors.

Figure 7:
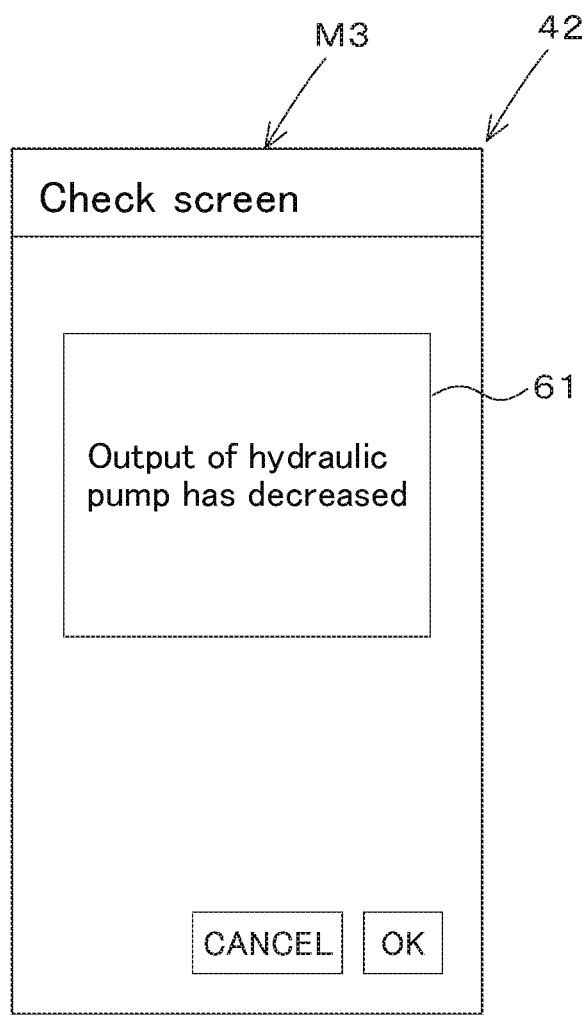
FIG. 7 is a diagram illustrating an example of a check screen M3.

When the error or the predicted failure symptom to be displayed in more detail is selected in the failure selection field 58, the controller 44 causes the display 42 to display a check screen M3 as illustrated in FIG. 7. The check screen M3 includes a detail display field 61. When an error (error code) is selected in the failure selection field 58, the detail display field 61 displays detailed information of the error. When a predicted failure symptom is selected in the failure selection field 58, the detail display field 61 displays a further detail of the predicted failure symptom.

When the operator selects an error related to the hydraulic pump from among the errors displayed in the failure selection field 58 of the selection screen M2 as illustrated in FIG. 6, the detail display field 61 displays, for example, information indicating that the power of the hydraulic pump has decreased as illustrated in FIG. 7. When a predicted failure symptom on the hydraulic pump is selected in the failure selection field 58, the detail display field 61 displays details of the failure in the hydraulic pump.

Figure 8:
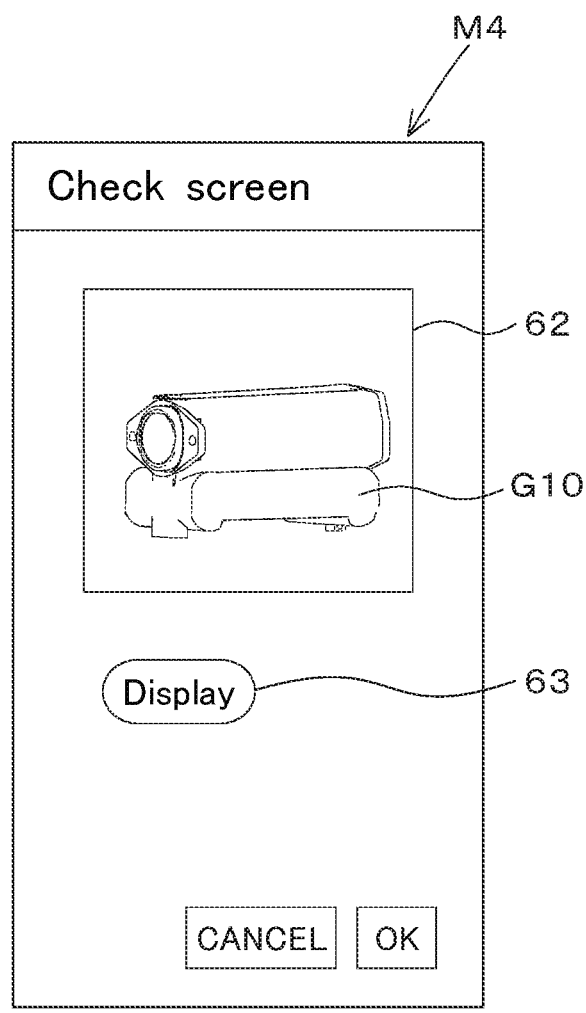
FIG. 8 is a diagram illustrating a check screen M4 different from that in FIG. 7.

When an error or a predicted failure symptom is selected in the failure selection field 58, the controller 44 can cause the display 42 to display a check screen M4 illustrated in FIG. 8 in place of the check screen M3 of FIG. 7. Whether to display the check screen M3 or the check screen M4 can be switched by an operation on the display 42.

As illustrated in FIG. 8, the check screen M4 includes a manual display field 62 and a display button 63. The manual display field 62 displays data related to a component corresponding to the error or data related to a component corresponding to the predicted failure symptom among the plurality of components shown in the manual data. For example, the manual display field 62 displays the name of the component, the external shape of the component, or a component diagram (illustrating connection or assembling between components).

For example, as illustrated in FIG. 8, when the error selected in the failure selection field 58 is related to the hydraulic pump or the predicted failure symptom is related to the hydraulic pump, the controller 44 extracts data on the hydraulic pump (name, external shape, and component diagram of the hydraulic pump) among the plurality of components shown in the manual data stored in the memory 43. When the data on the hydraulic pump is extracted, the controller 44 causes the manual display field 62 of the display 42 to display the name, external shape, and component diagram of the hydraulic pump. The manual display field 62 displays various descriptions related to the displayed component, that is, the hydraulic pump in the example of FIG. 8.

Figure 9:
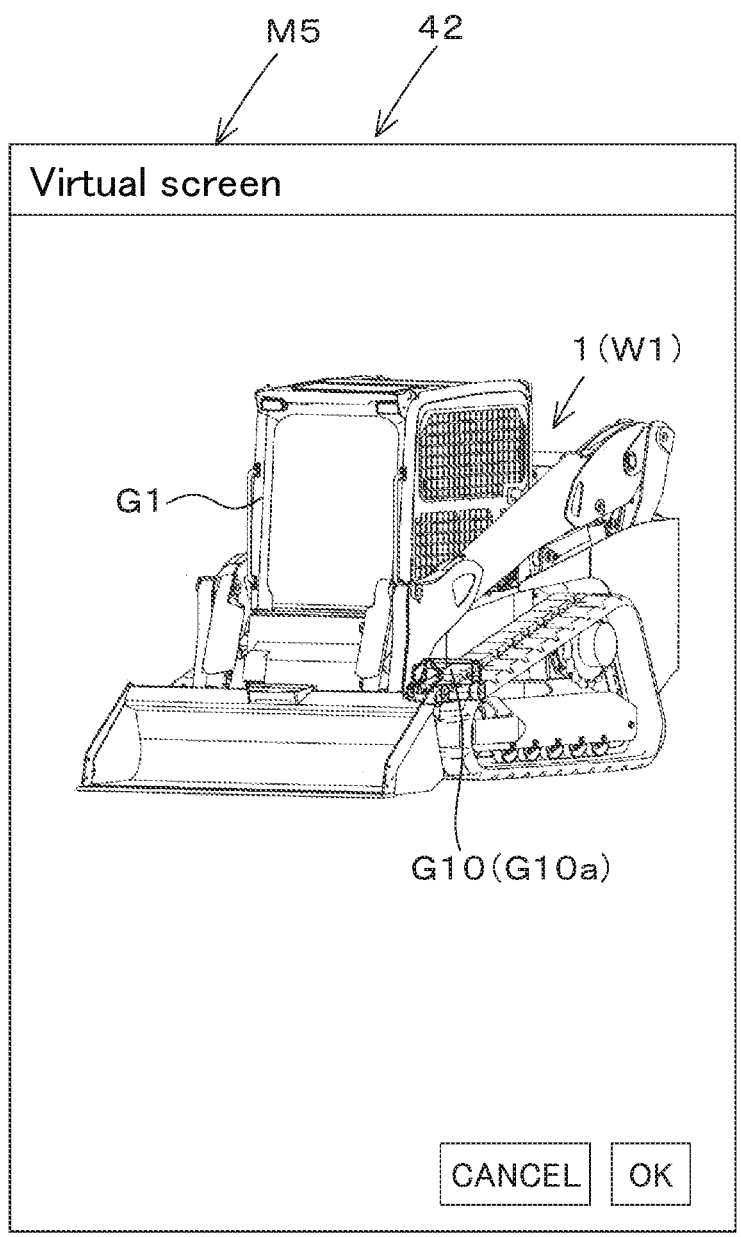
FIG. 9 is a diagram illustrating an example of a virtual screen M5.
Figure 10A:
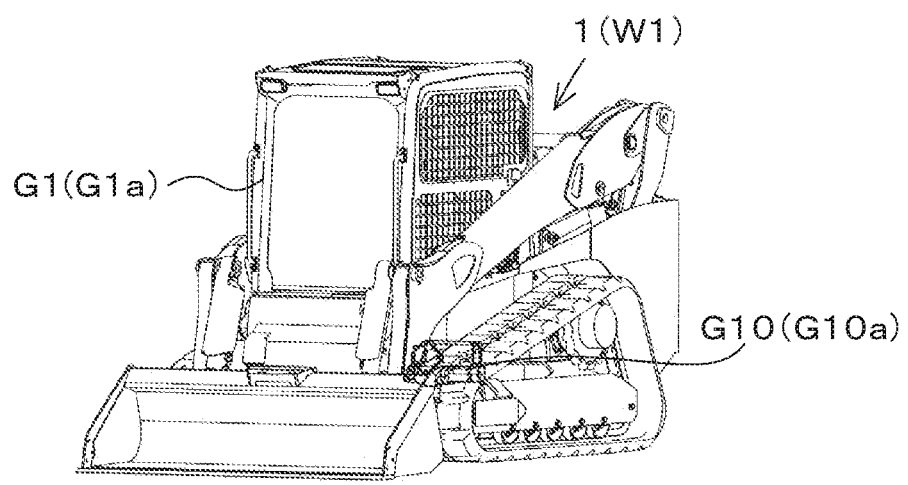
FIG. 10A is a diagram illustrating a captured image G1 obtained by capturing a working machine from the front, and a component G10.
Figure 10B:
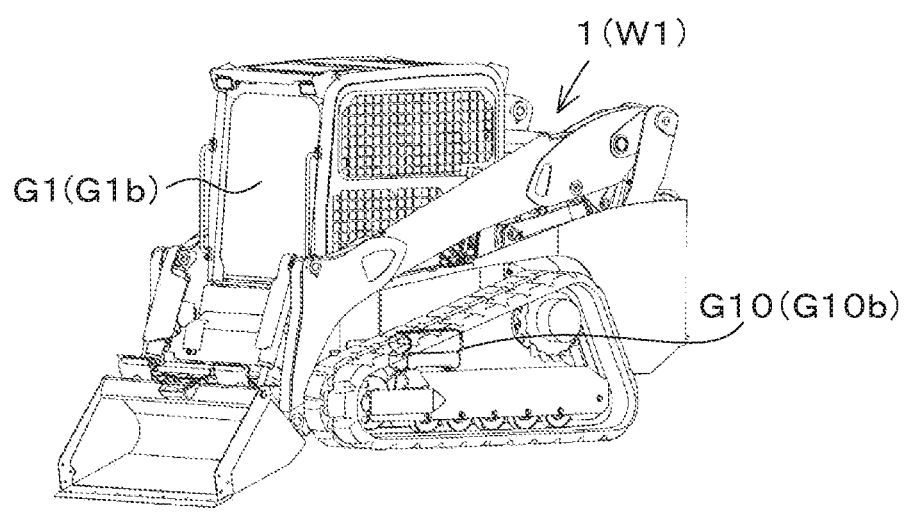
FIG. 10B is a diagram illustrating the captured image G1 and the component G10 when shifted rightward from the front of the working machine in FIG. 10A.
Figure 10C:
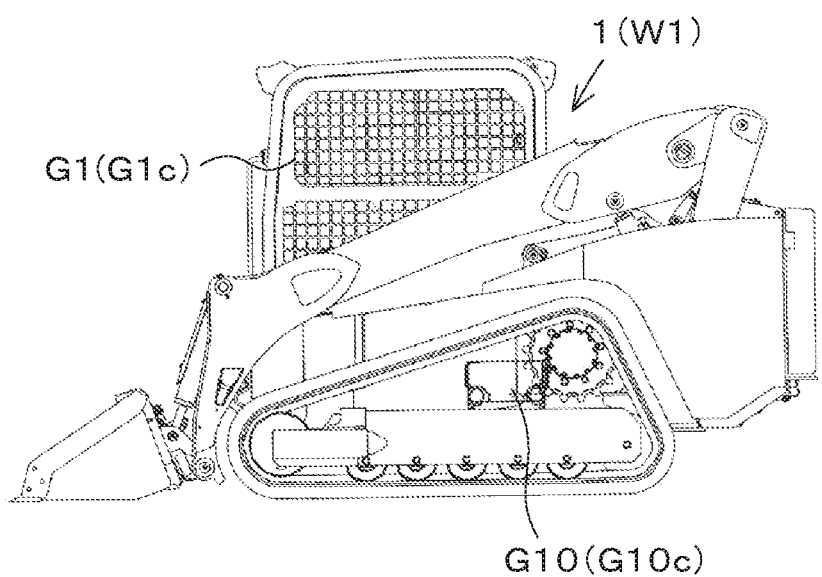
FIG. 10C is a diagram illustrating the captured image G1 and the component G10 when shifted to the side of the working machine.

When the operator selects the display button 63 while the display 42 is displaying the check screen M4, the controller 44 causes the display 42 to display a virtual screen M5 as illustrated in FIG. 9. The virtual screen M5 displays the captured image G1 of the working machine obtained by the imager 41 and a component G10 corresponding to the error or the predicted failure symptom selected in the failure selection field 58 such that the component G10 is superimposed on the captured image G1. When the captured image of the working machine obtained by the imager 41 changes like captured images G1a, G1b, and G1c as illustrated in FIGS. 10A to 10C, the controller 44 causes the component G10 (G10a, G10b, G10c) to be displayed to follow the change in the captured image G1 (G1a, G1b, G1c) on the virtual screen M5. A portion of the virtual screen M5 may display a diagram or description about the component G10 or a procedure for inspection, repair, replacement, or the like on the component G10 in addition to the captured image G1 and the component G10 that overlays the captured image G1.

Next, the relationship between the controller 44 and the display 42 is described in detail.

As illustrated in FIG. 1, the controller 44 includes an information acquirer 44A, a diagnoser 44B, and a data extractor 44C. The information acquirer 44A, the diagnoser 44B, and the data extractor 44C include, for example, electrical/electronic circuit(s) provided in the controller 44 and/or application software stored in the memory 43.

The information acquirer 44A can acquire information related to the working machine 1, and acquires, for example, information related to an error or a predicted failure symptom of a component of the working machine 1. Specifically, when unique information such as a machine type, model (model number), and serial number (identification information) is input to the input screen M1, the information acquirer 44A acquires the input unique information. When the operator selects an error (error code) or a predicted failure symptom associated with the component in the selection screen M2, the information acquirer 44A acquires the selected error or predicted failure symptom.

The diagnoser 44B identifies the working machine 1 based on the unique information acquired by the information acquirer 44A, and extracts diagnosis information of the identified specific working machine W1 from the memory 43. For example, when the specific working machine W1 has the model number "CTL95" and the serial number "KJ-1258991" as illustrated in FIG. 2, the diagnoser 44B extracts a list of errors (error codes) in the diagnosis information X1 associated with "CTL95" and "KJ-1258991" from the memory 43. When the diagnoser 44B extracts the error list of the specific working machine W1, the failure selection field 58 of the selection screen M2 displays the error list as described above.

When the information acquirer 44A acquires an error selected by the operator from the error list, the diagnoser 44B extracts detailed information corresponding to the error selected by the operator from the diagnosis information X1 stored in the memory 43, and causes the detail display field 61 of the check screen M3 to display the information. When the information acquirer 44A acquires the error selected by the operator from the error list, the diagnoser 44B extracts data corresponding to the error selected by the operator (name of the component, external shape of the component, and component diagram) from the manual data, and causes the manual display field 62 of the check screen M4 to display the data.

When the information acquirer 44A acquires a predicted failure symptom selected by the operator from the list of predicted failure symptoms, the diagnoser 44B extracts detailed information corresponding to the predicted failure symptom selected by the operator from the diagnosis information, and causes the detail display field 61 of the check screen M3 to display the information. When the information acquirer 44A acquires the predicted failure symptom selected by the operator from the list of predicted failure symptoms, the diagnoser 44B extracts data corresponding to the predicted failure symptom selected by the operator (name of the component, external shape of the component, and component diagram) from the manual data, and causes the manual display field 62 of the check screen M4 to display the data.

The data extractor 44C extracts drawing data including the component corresponding to the error or the predicted failure symptom from among the plurality of pieces of drawing data stored in the memory 43. For example, when the specific working machine W1 has the model number "CTL95" and the serial number "KJ-1258991" as illustrated in FIG. 3, the data extractor 44C extracts drawing data (KB1) associated with "CTL95" and "KJ-1258991", and transfers the extracted drawing data (KB1) to the display 42.

As shown in the virtual screen M5 of FIG. 9, the display 42 overlays, in the drawing data extracted by the data extractor 44C, the working machine 1 shown in the captured image G1 with the component G10 corresponding to the error or the predicted failure symptom. Specifically, when D1 represents a line drawing in the extracted drawing data and G1 represents a captured image as illustrated in FIG. 11, the controller 44 extracts feature points (feature amounts) Qn (n=1, 2, 3, 4 . . . ) in the captured image G1, and calculates corresponding points Rn (n=1, 2, 3, 4 . . . ) corresponding to the feature points (feature amounts) Qn in D1 of the drawing data. FIG. 11 illustrates Qn and Rn under the assumption that n=1 to 7 for convenience of the description.

The controller 44 calculates, for example, the scale and angle for overlaying the captured image G1 with the component G10 based on the feature points (feature amounts) Qn of the captured image G1 and the corresponding points Rn of the line drawing D1 of the drawing data, and displays the component G10 on the captured image G1 with the calculated scale and angle. That is, the controller 44 displays the component G10 by matching the captured image G1 with the line drawing D1 of the drawing data.

Every time the captured image G1 (G1a, G1b, G1c) changes as illustrated in FIGS. 10A to 10C, the controller 44 determines the scale and angle by matching with the line drawing D1 of the drawing data, and the display 42 displays the component G10 (G10a, G10b, G10c) on the captured image G1 to follow the change. The controller 44 may emphasize the display by, for example, blinking the image of the component G10 that overlays the captured image G1, putting a color recognizable by the operator, or displaying the outline with thick lines.

In the example described above, the controller 44 identifies, as the diagnosis target component, the component corresponding to the error or the predicted failure symptom selected by the operator from the list of errors or predicted failure symptoms displayed by the display 42, but the present invention is not limited to this example.

For example, the memory 43 may store a plurality of diagnoses, and the controller 44 may cause the display 42 to display one or more diagnoses and identify the diagnosis target component based on the operator's diagnosis input on the diagnoses displayed by the display 42. The controller 44 may identify the diagnosis target component by performing diagnosis interactively in which the display 42 displays further diagnoses in response to the operator's input on the diagnoses displayed by the display 42.

When the memory 43 stores the plurality of diagnoses with priority levels and a plurality of diagnoses are present corresponding to the state of the working machine 1, the controller 44 may cause the display 42 to display the diagnoses in a descending order in terms of the priority levels. In this case, the controller 44 identifies a diagnosis target component based on one of the diagnoses that is displayed by the display 42 and selected by the operator via an input, and causes the display 42 to display the diagnosis target component. For example, the priority levels may be set in descending order of easiness of diagnosis work, or may be set depending on periods required for the diagnosis work. The priority levels may be set depending on diagnosis results, periods required for repair or replacement work when necessary, costs for the work, or periods required to acquire replacement components, or may be set by combining those factors.

Figure 12:
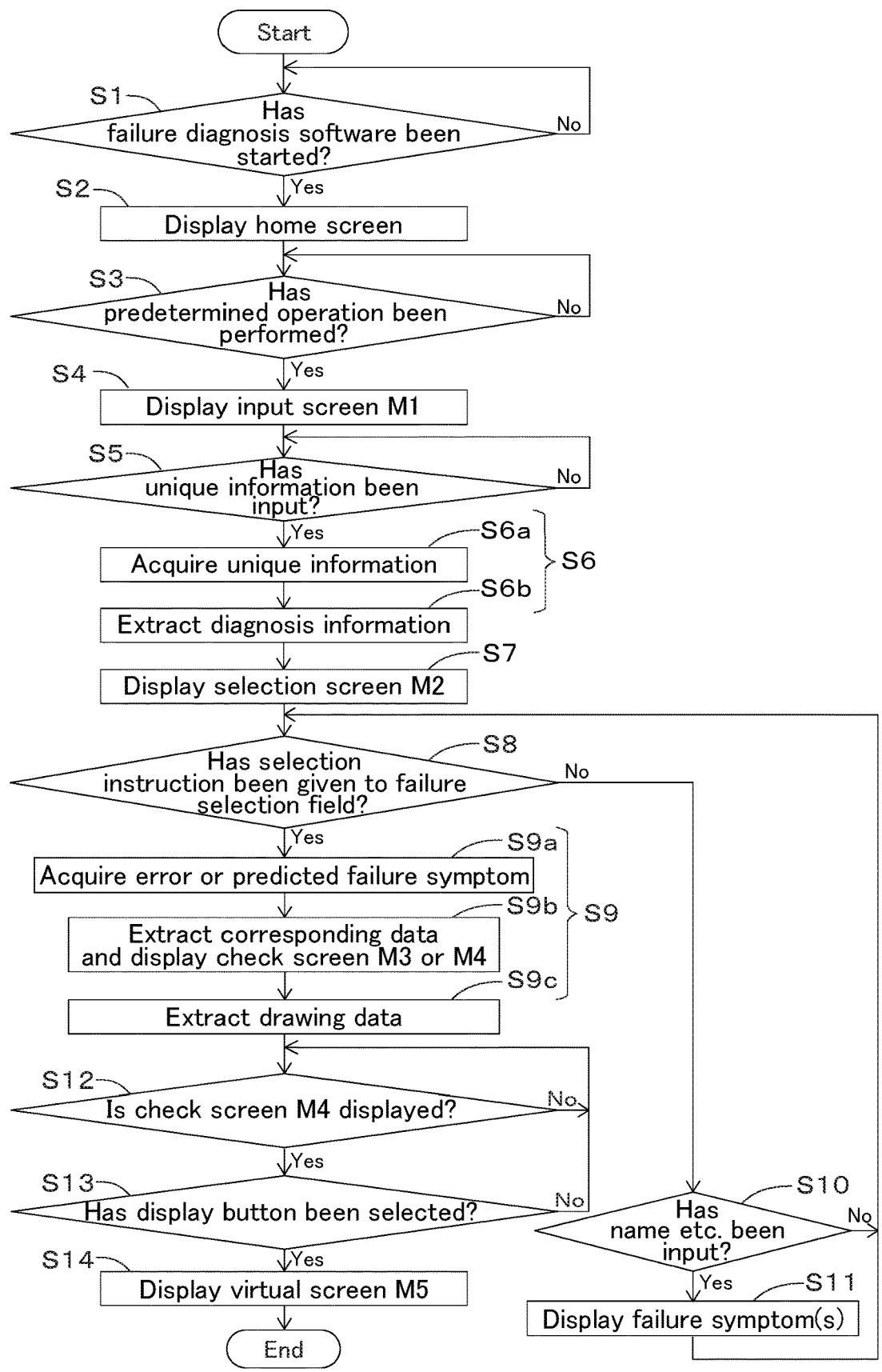
FIG. 12 is a flowchart illustrating a flow performed by the diagnosis assisting device for a working machine.

A flow performed by the diagnosis assisting device 40 to diagnose a failure of the working machine 1 is described below with reference to FIG. 12. When the failure diagnosis software stored in the memory 43 is started (S1: Yes), the controller 44 first causes the display 42 to display the home screen (not illustrated) (S2). When the operator performs a predetermined operation on the diagnosis assisting device 40 (display 42) (S3: Yes) while the display 42 is displaying the home screen (S2), the controller 44 causes the display 42 to display the input screen M1 (S4).

When the operator inputs unique information by performing a predetermined operation on the diagnosis assisting device 40 (display 42) (S5: Yes) while the display 42 is displaying the input screen M1 (S4), the controller 44 identifies the working machine 1 by extracting machine information corresponding to the unique information from the memory 43 based on the input unique information (S6). Specifically, the information acquirer 44A of the controller 44 acquires the input unique information (S6a). When the information acquirer 44A acquires the unique information (S6a), the diagnoser 44B of the controller 44 identifies the working machine 1 based on the unique information acquired by the information acquirer 44A, and extracts diagnosis information of the specific working machine W1 by extracting the machine information corresponding to the unique information from the memory 43 (S6b). In this manner, the controller 44 identifies the working machine 1 (S6).

When the controller 44 identifies the working machine 1 (S6), the controller 44 causes the display 42 to display the selection screen M2 (S7). When the display 42 displays the selection screen M2 (S7), the controller 44 determines whether the operator has given a selection instruction to the failure selection field 58 (S8).

When determination is made that the operator has given the selection instruction to the failure selection field 58 (S8: Yes), the controller 44 causes the display 42 to display the check screen M3 or the check screen M4 (S9). Specifically, the information acquirer 44A acquires the selection instruction in the failure selection field 58, that is, an error or a predicted failure symptom (S9a). When the information acquirer 44A acquires the error or the predicted failure symptom (S9a), the diagnoser 44B extracts data corresponding to the error or the predicted failure symptom from the information (diagnosis information) stored in the memory 43, and causes the display 42 to display the check screen M3 or the check screen M4 (S9b). When the diagnoser 44B extracts the data (S9b), the data extractor 44C extracts drawing data including a component corresponding to the error or the predicted failure symptom from among the pieces of drawing data stored in the memory 43 (S9c).

When determination is made that the operator has not given the selection instruction to the failure selection field 58 (S8: No), the controller 44 determines whether the operator has input the name of a component or the like to the failure search field 59 (S10). When determination is made that the operator has input the name of the component or the like to the failure search field 59 (S10: Yes), the controller 44 extracts machine information corresponding to the component from the memory 43 based on the input name of the component or the like, and causes the failure selection field 58 to display failure symptoms predicted from the component (S11).

The controller 44 determines whether the display 42 is displaying the check screen M4 (S12). When the display 42 is displaying the check screen M4 (S12: Yes), the controller 44 determines whether the display button 63 is selected (S13). When determination is made that the display button 63 is selected (S13: Yes), the controller 44 causes the display 42 to display the virtual screen M5 based on the drawing data extracted by the data extractor 44C in S9c (S14).

In the embodiment described above, the controller 44 acquires the error and the unique information of the working machine 1 and displays the component G10 on the captured image G1 when the unique information and the information related to the error or the predicted failure symptom of the component are input to the display 42. As illustrated in FIG. 1, the working machine 1 may include a communicator 35 communicable with the diagnosis assisting device 40, and the diagnosis assisting device may acquire the error and the unique information directly from the working machine 1 via the communicator 35.

Specifically, the operator performs a predetermined operation on the diagnosis assisting device 40 for the working machine 1, and the diagnosis assisting device 40 communicates with the communicator 35. In the working machine 1, the communicator transmits operation information including an error or the like and prestored unique information (machine type, model (model number), and serial number (identification information)) to the diagnosis assisting device 40. Therefore, the information acquirer 44A of the diagnosis assisting device 40 can acquire the error and the unique information from the communicator 35. Thus, the input of information to the input screen M1 and the selection of an error on the selection screen M2 can be omitted.

When the error and the unique information are acquired via the communicator 35, the diagnosis assisting device 40 causes the display 42 to display, for example, detailed information of the error and data corresponding to the error selected by the operator (name of the component, external shape of the component, and component diagram) in the manual data similarly to the embodiment described above. The display 42 displays the component G10 corresponding to the error on the captured image G1.

Figure 14:
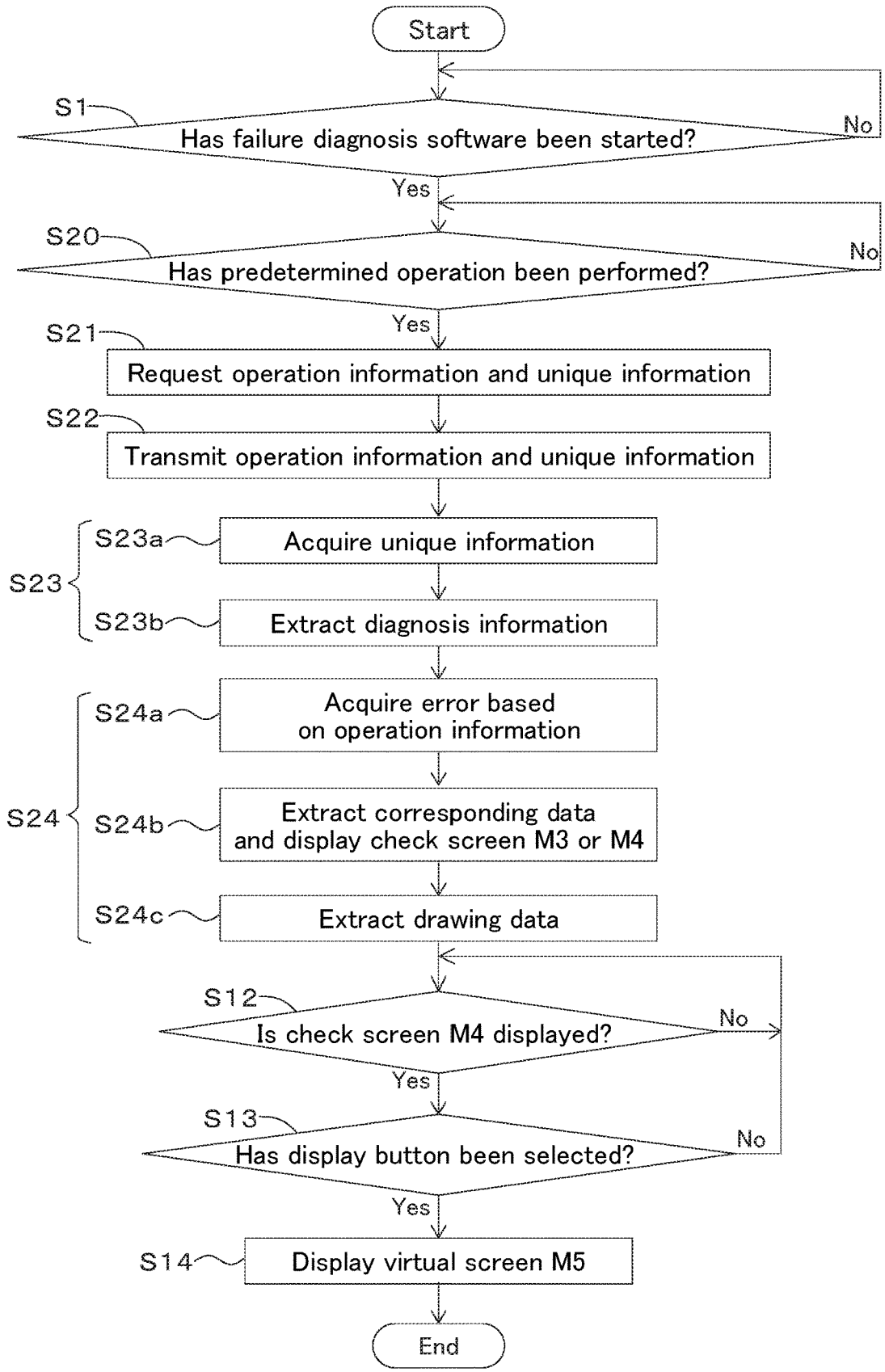
FIG. 14 is a flowchart illustrating a flow performed by the diagnosis assisting device for a working machine in the modified example.

That is, in the serial flow of the embodiment described above (see FIG. 12), this modified example differs in that S2 to S9 are changed to S20 to S24 as illustrated in FIG. 14.

Specifically, when the controller 44 starts the failure diagnosis software stored in the memory 43 (S1: Yes), the controller 44 determines whether the operator has performed a predetermined operation (S20). When determination is made that the operator has performed the predetermined operation (S20: Yes), the controller 44 communicates with the working machine 1 via the communicator 35 and requests operation information and unique information (S21). When the controller 44 requests the operation information and the unique information (S21), the working machine 1 transmits the operation information and the unique information to the controller 44 via the communicator 35 (S22).

When the working machine 1 transmits the operation information and the unique information to the controller 44 (S22), the controller 44 identifies the working machine 1 by extracting machine information corresponding to the unique information from the memory 43 based on the unique information transmitted from the working machine 1 (S23). Specifically, the information acquirer 44A of the controller 44 acquires the input unique information (S23a). When the information acquirer 44A acquires the unique information (S23a), the diagnoser 44B of the controller 44 identifies the working machine 1 based on the unique information acquired by the information acquirer 44A, and extracts diagnosis information of the specific working machine W1 by extracting the machine information corresponding to the unique information from the memory 43 (S23b). In this manner, the controller 44 identifies the working machine 1 (S23).

When the controller 44 identifies the working machine 1 (S23), the controller 44 causes the display 42 to display the check screen M3 or the check screen M4 (S24). Specifically, the information acquirer 44A acquires, based on operation information, an error (S24a). When the information acquirer 44A acquires the error (S24a), the diagnoser 44B extracts data corresponding to the error from the information (diagnosis information) stored in the memory 43, and causes the display 42 to display the check screen M3 or the check screen M4 (S24b). When the diagnoser 44B extracts the data (S24b), the data extractor 44C extracts drawing data including a component corresponding to the error or the predicted failure symptom from among the pieces of drawing data stored in the memory 43 (S24c).

Figure 13:
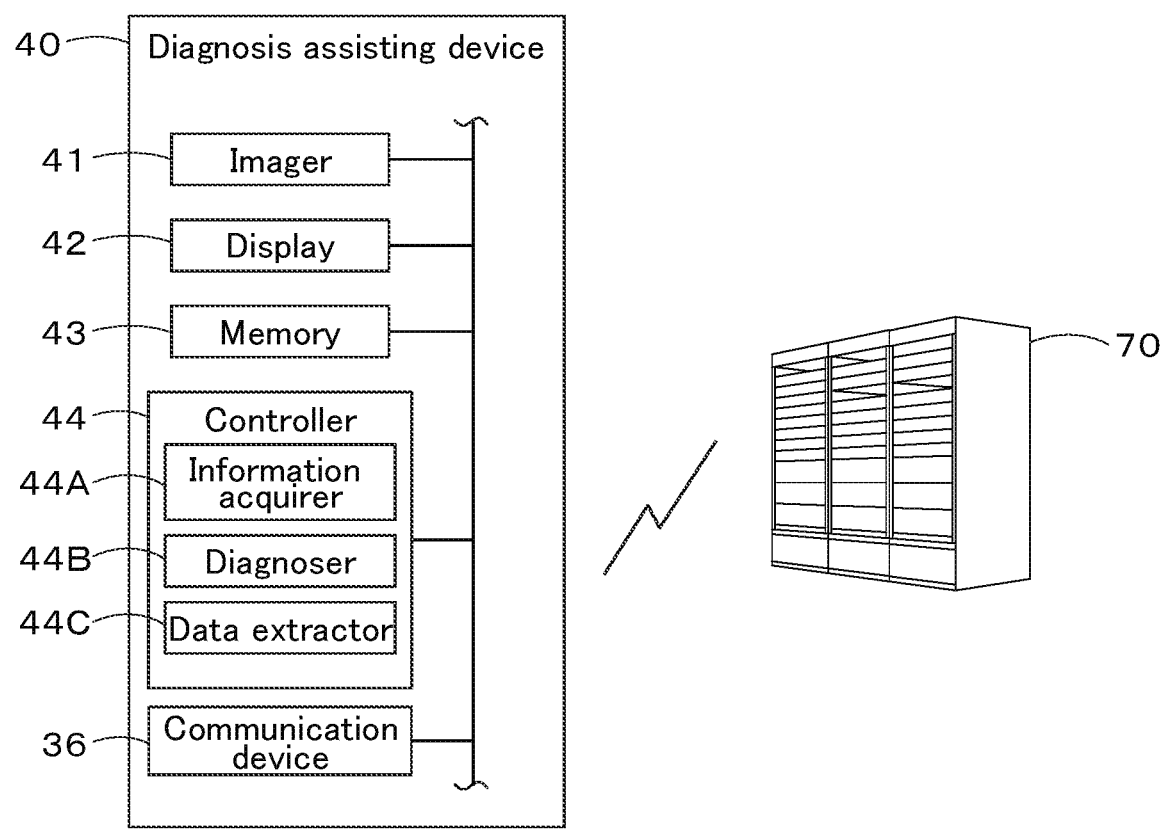
FIG. 13 is a block diagram of a diagnosis assisting device for a working machine in a modified example.

As illustrated in FIG. 13, the diagnosis assisting device 40 may include a communication device 36 and, when communication can be made with a server 70 on a communication network by using the communication device 36 by a predetermined communication method (for example, Wi-Fi (registered trademark)), the controller 44 may automatically transmit, to the server 70, information indicating the error selected by the operator, predicted failure information, and diagnosis input.

The diagnosis assisting device 40 may include the communication device 36 and, when communication can be made with the server 70 on the communication network by using the communication device 36 by the predetermined communication method (for example, Wi-Fi (registered trademark)), the information acquirer 44A may automatically receive the predicted failure symptom, the diagnosis, or the like and store it in the memory 43.

In the embodiment described above, the captured image G1 is overlaid with the component G10 corresponding to the error, but the line drawing D1 of the drawing data may be displayed alone by hiding the captured image G1. In this case, the display 42 can switch between a mode in which the captured image G1 is overlaid with the component G10 and a mode in which the line drawing D1 of the drawing data including the component G10 is displayed alone.

A diagnosis assisting device 40 for a working machine 1 as has been discussed includes: an imager 41 to capture an image of a working machine 1; a display 42 to display the image of the working machine 1 captured by the imager 42; a controller 44 to control the display 42; a memory 43 to store one or more pieces of drawing data of one or more of the working machines 1; an input to receive input from an operator; and a data extractor 44c to extract one of the one or more pieces of drawing data stored in the memory 43 that corresponds to at least one component to be diagnosed, wherein the controller 44 is configured or programmed to cause the display 42 to display the one of the one or more pieces of drawing data extracted by the data extractor 44c and the image of the working machine 1 captured by the imager 41 such that the at least one component G10 indicated by the one of the one or more pieces of drawing data is superimposed on at least one corresponding component G10 in the image of the working machine captured by the imager. With this, because the imager 41 captures an image of the working machine 1 and the component G10 is superimposed on the captured image G1 of the working machine 1 on the display 42, the operator can easily know the position of the component. For example, the operator can easily know the position of the component G10 when replacing or repairing the component.

The controller 44 may be configured or programmed to cause the display to display the captured image of the working machine 1 and the one of the one or more pieces of drawing data such that, when the captured image of the working machine 1 changes, the at least one component G10 indicated by the one of the one or more pieces of drawing data follows the at least one corresponding component G10 in the captured image as the captured image changes. With this, the position of the component G10 of the working machine 1 can virtually be displayed easily by using drawing data of the working machine 1, and the operator can easily know the position of the component G10.

The diagnosis assisting device 40 may further include an information acquirer 44A to acquire a piece of information transmitted from the working machine 1 and related to an error having occurred in the working machine 1. The controller 44 may be configured or programmed to identify the at least one component G10 to be diagnosed based on the piece of information related to the error acquired by the information acquirer 44A. With this, the operator can easily identify the component G10 corresponding to the error.

The controller 44 may be configured or programmed to, when the information acquirer 44A acquires a plurality of the pieces of information related to a plurality of the errors having occurred in the working machine 1, cause the display 42 to display the plurality of pieces of information related to the plurality of the errors, and identify, as the at least one component G10 to be diagnosed, a component G10 corresponding to one of the plurality of errors that corresponds to one of the plurality of pieces of information displayed by the display 42 and selected by the operator via the input. With this, when a plurality of errors occur, the component G10 corresponding to the error selected by the operator or the like from among the plurality of errors can be identified and displayed by the display 42.

The memory 43 may store priority levels of a plurality of the pieces of information related to a plurality of the errors. The controller 44 may be configured or programmed to, when the information acquirer 44A acquires a plurality of the pieces of information related to a plurality of the errors having occurred in the working machine 1, identify, as the at least one component G10 to be diagnosed, a component G10 corresponding to one of the plurality of pieces of information relating to the plurality of errors, the one of the plurality of pieces of information having a highest one of the priority levels. With this, when there are a plurality of errors, a component corresponding to an error with priority can be diagnosed.

The diagnosis assisting device 40 may further include a communication device 36. The information acquirer 44A may be configured or programmed to, upon establishment of communication between the information acquirer 44A and a predetermined server 70 via the communication device 36 by a predetermined communication method, transmit the piece of information related to the error to the server 70. With this, the server 70 can collect errors.

The memory 43 may store one or more predicted failure symptoms of the working machine 1. The controller 444 may be configured or programmed to cause the display 42 to display one or more of the one or more predicted failure symptoms corresponding to a state of the working machine, and identify the at least one component G10 to be diagnosed based on one of the displayed one or more of the one or more predicted failure symptoms selected by the operator via the input. With this, when the plurality of predicted failure symptoms are present, the component G10 corresponding to the predicted failure symptom selected by the operator or the like from among the plurality of predicted failure symptoms can be identified and displayed by the display 42.

The memory 43 may store priority levels of a plurality of the predicted failure symptoms. The controller 44 may be configured or programmed to, when a plurality of the predicted failure symptoms corresponding to the state of the working machine 1 are present, cause the display to display the plurality of the predicted failure symptoms in a descending order in terms of the priority levels. With this, when a plurality of predicted failure symptoms are present, predicted failure information having a high priority level can be known easily.

The diagnosis assisting device 40 may further include: an information acquirer 44A to acquire a piece of information transmitted from the working machine 1 and related to an error having occurred in the working machine 1; and a communication device 36. The information acquirer 44A may be configured or programmed to, upon establishment of communication between the information acquirer 44A and a predetermined server 70 via the communication device 36 by a predetermined communication method, transmit, to the server 70, the one of the displayed one or more of the one or more predicted failure symptoms selected by the operator via the input. With this, the server 70 can collect predicted failure symptoms.

The diagnosis assisting device 40 may further include: an information acquirer 44A to acquire a piece of information transmitted from the working machine 1 and related to an error having occurred in the working machine 1; and a communication device 36. The information acquirer 44A may be configured or programmed to, upon establishment of communication between the information acquirer 44A and a predetermined server 70 via the communication device 36 by a predetermined communication method, acquire the one or more predicted failure symptoms from the server 70 and cause the memory to 43 store the one or more predicted failure symptoms. With this, the server 70 can collect predicted failure symptoms.

The memory 43 may store diagnoses for the working machine 1. The controller 44 may be configured or programmed to cause the display 42 to display one or more of the diagnoses corresponding to a state of the working machine, and identify the at least one component G10 to be diagnosed based on one of the displayed one or more of the diagnoses selected by the operator via the input. With this, the diagnoses can be displayed easily.

The memory 43 may store priority levels of a plurality of diagnoses. The controller 44 may be configured or programmed to, when a plurality of the diagnoses corresponding to a state of the working machine are present, cause the display to display the plurality of the diagnoses in a descending order in terms of the priority levels. With this, when a plurality of diagnoses are present, the operator can easily know a diagnosis having a high priority level.

The diagnosis assisting device 40 may further include: an information acquirer 44A to acquire a piece of information transmitted from the working machine 1 and related to an error having occurred in the working machine 1; and a communication device 36. The information acquirer 44A may be configured or programmed to, upon establishment of communication between the information acquirer 44A and a predetermined server 70 via the communication device 36 by a predetermined communication method, transmit, to the server 70, information corresponding to the one of the displayed one or more of the diagnoses selected by the operator via the input. With this, the server 70 can collect diagnoses.

The diagnosis assisting device 40 may further include: an information acquirer 44A to acquire a piece of information transmitted from the working machine 1 and related to an error having occurred in the working machine 1; and a communication device 36. The information acquirer 44A may be configured or programmed to, upon establishment of communication between the information acquirer 44A and a predetermined server 70 via the communication device 36 by a predetermined communication method, automatically acquire the diagnoses for the working machine 1 from the server 70 and cause the memory 43 to store the diagnoses. With this, the server 70 can collect diagnoses.

The memory 43 may store one or more pieces of manual data indicating one or more manuals related to one or more of the working machines 1. The controller 44 may be configured or programmed to cause the display 42 to display one or more of the one or more pieces of manual data corresponding to the at least one component G10. With this, the operator can easily refer to the manual data corresponding to the target component G10. Therefore, the operator can not only know the position of the component G10 easily but also perform work smoothly.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A diagnosis assisting device for a working machine, comprising:
an imager to capture an image of a working machine;
a display to display the image of the working machine captured by the imager;
a controller to control the display;
a memory to store a plurality of pieces of drawing data relating to at least one component of one or more of the working machines;
an input to receive at least input for identifying the working machine from an operator; and
a data extractor to extract, from the plurality of pieces of drawing data stored in the memory, one piece of drawing data relating to a component that corresponds to at least one component to be diagnosed, the one component to be diagnosed being of the working machine identified based on the input received by the input, wherein
the controller is configured or programmed to cause the display to display the component of the one piece of drawing data extracted by the data extractor so as to be superimposed on at least one corresponding component in the image of the working machine captured by the imager.

2. The diagnosis assisting device according to claim 1, wherein the controller is configured or programmed to cause the display to display, when the captured image of the working machine changes, the component of the one piece of drawing data extracted by the data extractor so as to follow the at least one corresponding component in the captured image of the working machine as the captured image changes.

3. The diagnosis assisting device according to claim 1, further comprising an information acquirer to acquire a piece of information transmitted from the working machine and related to an error having occurred in the working machine, wherein
the controller is configured or programmed to identify the at least one component to be diagnosed based on the piece of information related to the error acquired by the information acquirer.

4. The diagnosis assisting device according to claim 3, wherein the controller is configured or programmed to, when the information acquirer acquires a plurality of the pieces of information related to a plurality of the errors having occurred in the working machine, cause the display to display the plurality of pieces of information related to the plurality of the errors, and identify, as the at least one component to be diagnosed, a component corresponding to one of the plurality of errors that corresponds to one of the plurality of pieces of information displayed by the display and selected by the operator via the input.

5. The diagnosis assisting device according to claim 3, wherein
the memory stores priority levels of a plurality of the pieces of information related to a plurality of the errors, and
the controller is configured or programmed to, when the information acquirer acquires a plurality of the pieces of information related to a plurality of the errors having occurred in the working machine, identify, as the at least one component to be diagnosed, a component corresponding to one of the plurality of pieces of information relating to the plurality of errors, the one of the plurality of pieces of information having a highest one of the priority levels.

6. The diagnosis assisting device according to claim 3, further comprising a communication device, wherein
the information acquirer is configured or programmed to, upon establishment of communication between the information acquirer and a predetermined server via the communication device by a predetermined communication method, transmit the piece of information related to the error to the server.

7. The diagnosis assisting device according to claim 1, wherein
the memory stores one or more predicted failure symptoms of the working machine, and
the controller is configured or programmed to cause the display to display one or more of the one or more predicted failure symptoms corresponding to a state of the working machine, and identify the at least one component to be diagnosed based on one of the displayed one or more of the one or more predicted failure symptoms selected by the operator via the input.

8. The diagnosis assisting device according to claim 7, wherein
the memory stores priority levels of a plurality of the predicted failure symptoms, and
the controller is configured or programmed to, when a plurality of the predicted failure symptoms corresponding to the state of the working machine are present, cause the display to display the plurality of the predicted failure symptoms in a descending order in terms of the priority levels.

9. The diagnosis assisting device according to claim 7, further comprising:
an information acquirer to acquire a piece of information transmitted from the working machine and related to an error having occurred in the working machine; and
a communication device, wherein
the information acquirer is configured or programmed to, upon establishment of communication between the information acquirer and a predetermined server via the communication device by a predetermined communication method, transmit, to the server, the one of the displayed one or more of the one or more predicted failure symptoms selected by the operator via the input.

10. The diagnosis assisting device according to claim 7, further comprising:
an information acquirer to acquire a piece of information transmitted from the working machine and related to an error having occurred in the working machine; and a communication device, wherein
the information acquirer is configured or programmed to, upon establishment of communication between the information acquirer and a predetermined server via the communication device by a predetermined communication method, acquire the one or more predicted failure symptoms from the server and cause the memory to store the one or more predicted failure symptoms.

11. The diagnosis assisting device according to claim 1, wherein
the memory stores diagnoses for the working machine, and
the controller is configured or programmed to cause the display to display one or more of the diagnoses corresponding to a state of the working machine, and identify the at least one component to be diagnosed based on one of the displayed one or more of the diagnoses selected by the operator via the input.

12. The diagnosis assisting device according to claim 11, further comprising:
an information acquirer to acquire a piece of information transmitted from the working machine and related to an error having occurred in the working machine; and
a communication device, wherein
the information acquirer is configured or programmed to, upon establishment of communication between the information acquirer and a predetermined server via the communication device by a predetermined communication method, transmit, to the server, information corresponding to the one of the displayed one or more of the diagnoses selected by the operator via the input.

13. The diagnosis assisting device according to claim 11, further comprising:
an information acquirer to acquire a piece of information transmitted from the working machine and related to an error having occurred in the working machine; and
a communication device, wherein
the information acquirer is configured or programmed to, upon establishment of communication between the information acquirer and a predetermined server via the communication device by a predetermined communication method, automatically acquire the diagnoses for the working machine from the server and cause the memory to store the diagnoses.

14. The diagnosis assisting device according to claim 1, wherein
the memory stores priority levels of a plurality of diagnoses, and
the controller is configured or programmed to, when a plurality of the diagnoses corresponding to a state of the working machine are present, cause the display to display the plurality of the diagnoses in a descending order in terms of the priority levels.

15. The diagnosis assisting device according to claim 1, wherein
the memory stores one or more pieces of manual data indicating one or more manuals related to one or more of the working machines, and
the controller is configured or programmed to cause the display to display one or more of the one or more pieces of manual data corresponding to the at least one component.

* * * * *